Oct. 15, 1968   R. A. SINKE, JR   3,405,557

GEAR TOOTH MESH PROFILE MEASURING SYSTEM

Filed April 29, 1966

INVENTOR.
Robert A. Sinke, Jr.
BY
Thomas N. Young
ATTORNEY

United States Patent Office 3,405,557
Patented Oct. 15, 1968

3,405,557
**GEAR TOOTH MESH PROFILE
MEASURING SYSTEM**
Robert A. Sinke, Jr., Brighton, Mich., assignor to General
Motors Corporation, Detroit, Mich., a corporation of
Delaware
Filed Apr. 29, 1966, Ser. No. 546,349
5 Claims. (Cl. 73—162)

ABSTRACT OF THE DISCLOSURE

A method and apparatus for dynamically detecting gear tooth profile errors by rotating a drive gear at a fixed angular velocity, meshing the drive gear with a test gear and sensing angular accelerations of the test gear when rotated by the drive gear.

---

This invention relates to the testing of gears for tooth profile errors and more particularly for apparatus for sensing the presence of gear tooth profile errors as a function of test performance characteristics.

Two perfect rotatable gears, such as a pinion and a ring gear, when meshed with each other should rotate at a constant angular velocity. The presence of tooth profile errors in the gear set under test will cause improper meshing and result in minute angular accelerations of the gears under test as they rotate.

In accordance with the present invention, tooth profile errors are detected as a function of the test performance characteristics of the gears. This is accomplished by engaging the gears under test, driving the pinion gear at a constant angular velocity, and sensing any angular accelerations of the ring gear caused by improper meshing due to tooth profile errors. It will be understood that the invention is not limited to pinion and ring gear combinations.

The following specification describes a specific embodiment of the invention and is to be taken with the accompanying drawings of which:

Figure 1:
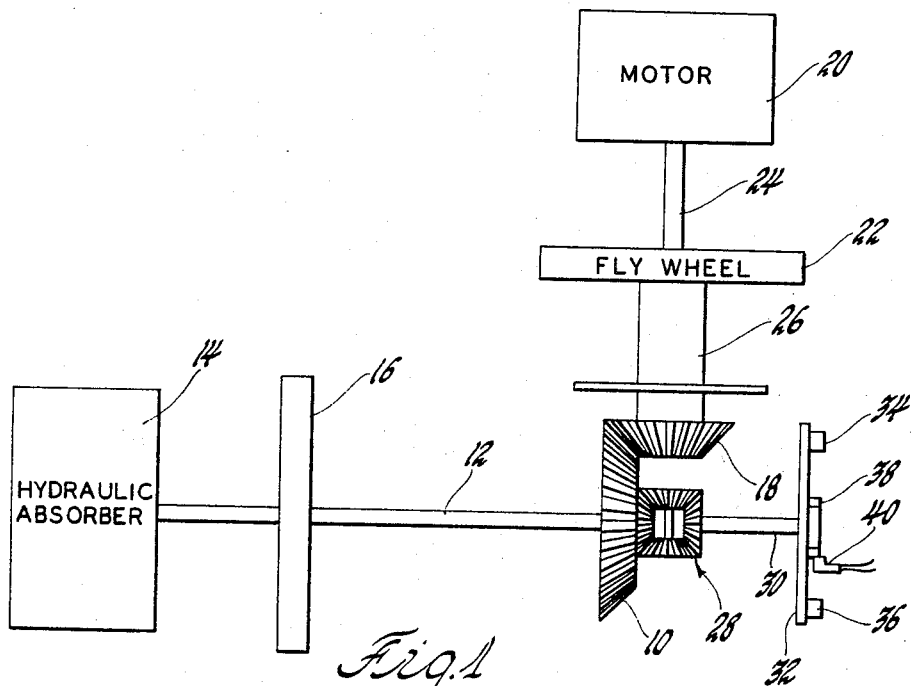
FIGURE 1 is a schematic diagram of an illustrative gear test setup.

Referring to FIGURE 1, a ring gear 10 and a pinion 18 are under test for the presence of tooth mesh profile errors. Gear 10 is mechanically connected through a relatively flexible shaft 12 to a hydraulic absorber 14 which is variable to present various loads to gear 10. An inertia member 16 such as a flywheel is also connected to the shaft 12 as shown. A constant angular velocity reference is established by a pinion 18. Pinion 18 is rotated at a constant velocity by a motor 20 which is connected to a high inertia flywheel 22 through a relatively flexible shaft 24. Shaft 24 effectively filters out any small speed variations experienced by motor 20 and prevents such variations from reaching flywheel 22. Pinion 18 is connected to the flywheel 22 by a relatively stiff shaft 26 which prevents variation in speed between pinion 18 and flywheel 22.

Pinion 18 is engaged with test gear 10 and rotated at a constant angular velocity. Ring gear 10 should also rotate at a constant angular velocity; however, tooth mesh profile errors in gear set 10, 18 will subject the gears to small angular accelerations which occur in a cyclical pattern. These angular accelerations are sensed by operatively connecting test gear 10 through a mechanically locked differential unit 28 and a shaft 30 to a support disc 32. Disc 32 carries two sensitive crystal accelerometers 34 and 36 located at diametrically opposite points with respect to the axis of rotation of support disc 32. The disc and accelerometers thus rotate with gear 10 and experience substantially the same accelerations as experienced by test gear 10. Accelerometers 34 and 36 produce output signals corresponding to the accelerations. The output signals are taken off the rotating apparatus for detection in appropriate electrical means by way of slip rings diagrammatically indicated at 38 and a pickoff 40.

Figure 2:
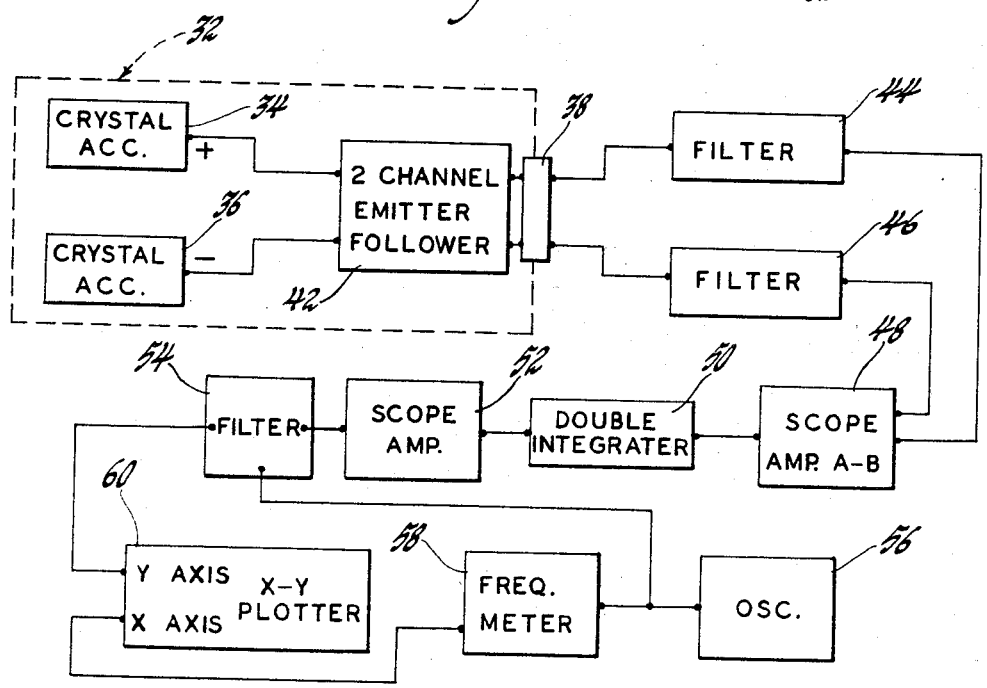
FIGURE 2 is a block diagram of electrical circuitry adapted to receive and process electrical signals generated by the apparatus of FIGURE 1.

Referring to FIGURE 2, the accelerometers 34 and 36 which are mounted on disc 32 are adapted to produce output signals of opposite polarity in response to accelerations along the sensitive axes thereof. These axes are arranged to be tangential to the support disc 32 such that the accelerometer signals effectively represent angular accelerations of test gear 10. The signals are transmitted through a two-channel emitter follower 42 to lower the output impedance level prior to transmitting the signals through slip rings 38. The signals are passed through filters 44 and 46 to reduce low frequency noise and amplified at 48. Amplifier 48 also serves to algebraically subtract the signals. Since the acceleration signals are of opposite polarity, the algebraic subtraction serves to produce an acceleration signal of double the magnitude originally produced by the individual accelerometers 34 and 36. On the other hand, this algebraic combination serves to cancel any acceleration signals which might be produced by a lateral displacement of support disc 32, it being understood that such lateral displacement would produce signals of like polarity from accelerometers 34 and 36.

At this point, it should be noted that the accelerometers may be set up to produce signals of like polarity in response to angular accelerations and amplifier 48 rewired to perform an addition function. In this arrangement, lateral acceleration or displacement of disc 32 would produce output signals of opposite polarity from the accelerometers, which signals would cancel by virtue of the addition process at 48.

For analysis purposes, the combined output signal of amplifier 48 is subjected to a double integration process at 50 to produce an output signal representing angular displacement. This signal may be amplified at 52 and filtered at 54. Oscillator 56 provides a tuning signal for variable bandpass filter 54. The signal from oscillator 56 may also be fed to the input of a frequency meter 58 to produce a DC output signal. The output of filter 54 may be connected to one input of a two-axis plotter 60 and the output of frequency meter 58 connected to the other input of the two-axis plotter. The plotter 60 may be used to obtain a permanent record of the displacement and therefore angular acceleration characteristics of test gear 10.

While the subject invention has been described with reference to a specific embodiment of apparatus for carrying out the invention, it is to be understood that this description is not to be construed in a limiting sense. For a definition of the invention reference should be had to the appended claims.

I claim:

1. Apparatus for detecting tooth mesh profile errors in a gear set including means for mounting a test gear for rotation about the axis thereof, a driving gear meshing with the test gear, means for rotating the driving gear at a constant speed, and accelerometer means operatively associated with the test gear for providing an output signal related to the character of angular accelerations of the test gear.

2. Apparatus as defined in claim 1 wherein the accelerometer means comprises support means connected to be rotated about an axis by the test gear, a pair of accelerometers mounted on the support means at diametrically opposite points with respect to the axis of rotation and responsive to tangential accelerations to produce acceleration signals, the combination further including circuit means for algebraically combining the respective signals to provide an output signal related to angular accelerations of the support means, but to cancel the respective signals occurring upon lateral acceleration of the support means.

3. Apparatus as defined in claim 2 further including integrator means connected to the circuit means for producing a displacement signal in response to said output signal, and means for displaying the displacement signal.

4. The method of detecting tooth mesh profile errors in a gear set comprising the steps of engaging a driving gear with a second gear, rotating the engaged driving gear at a constant angular velocity, and measuring the angular accelerations of the second gear while driven by the driving gear.

5. The method of detecting tooth mesh profile errors in a gear set of at least two gears comprising the steps of meshing the gears of said set, drivingly rotating one of the gears at a constant angular velocity, loading another of the gears, and measuring the angular accelerations of said another of the gears while being driven by said one gear.

References Cited
UNITED STATES PATENTS

| | | | |
|---|---|---|---|
| 2,365,218 | 12/1944 | Rogers | 73—517 |
| 3,280,624 | 10/1966 | Weinert | 73—162 |

S. CLEMENT SWISHER, *Acting Primary Examiner.*

WILLIAM HENRY, *Assistant Examiner.*